United States Patent [19]
Buckles

[11] 3,721,004
[45] March 20, 1973

[54] PRUNING TOOL
[76] Inventor: John Q. Buckles, Cincinnati, Ohio
[22] Filed: April 7, 1972
[21] Appl. No.: 241,900

Related U.S. Application Data

[63] Continuation-in-part of Ser. No. 125,276, March 17, 1971, abandoned.

[52] U.S. Cl. ................................................. 30/228
[51] Int. Cl. ............................................. B26b 15/00
[58] Field of Search ......... 30/228, 245, 249, 250, 251

[56] References Cited

UNITED STATES PATENTS

| | | |
|---|---|---|
| 596,890 | 1/1898 | Le Sage ................................. 30/245 |
| 2,366,909 | 1/1945 | Johnson ................................ 30/228 |
| 2,504,405 | 4/1950 | Fletcher ................................ 30/249 |
| 2,580,831 | 1/1952 | Persak .................................. 30/248 |
| 2,777,196 | 1/1957 | Zoetemelk ........................... 30/248 |
| 3,317,997 | 5/1967 | Hedstrom ............................ 30/248 |

Primary Examiner—Robert C. Riordon
Assistant Examiner—J. C. Peters
Attorney—James S. Hight et al.

[57] ABSTRACT

A pruning tool comprising an elongated hollow tube, which may be in sections, a cutter on one end of the tube having a pivoted cutting element, a piston and cylinder at the other end of the tube and a flexible cable passing through the center of the tube and connected to the piston and cylinder at one end of the cutting element at the other end wherein the cutting element is operated by applying tension to the cable by means of the piston and cylinder. Centering means are provided for the cable so that the cable, when tensioned, stresses the tube only in compression, without introducing any substantial bending moment.

16 Claims, 9 Drawing Figures

PATENTED MAR 20 1973

INVENTOR.
John Q. Buckles
BY Robert M. Buckles
Wood, Herron & Evans
ATTORNEYS

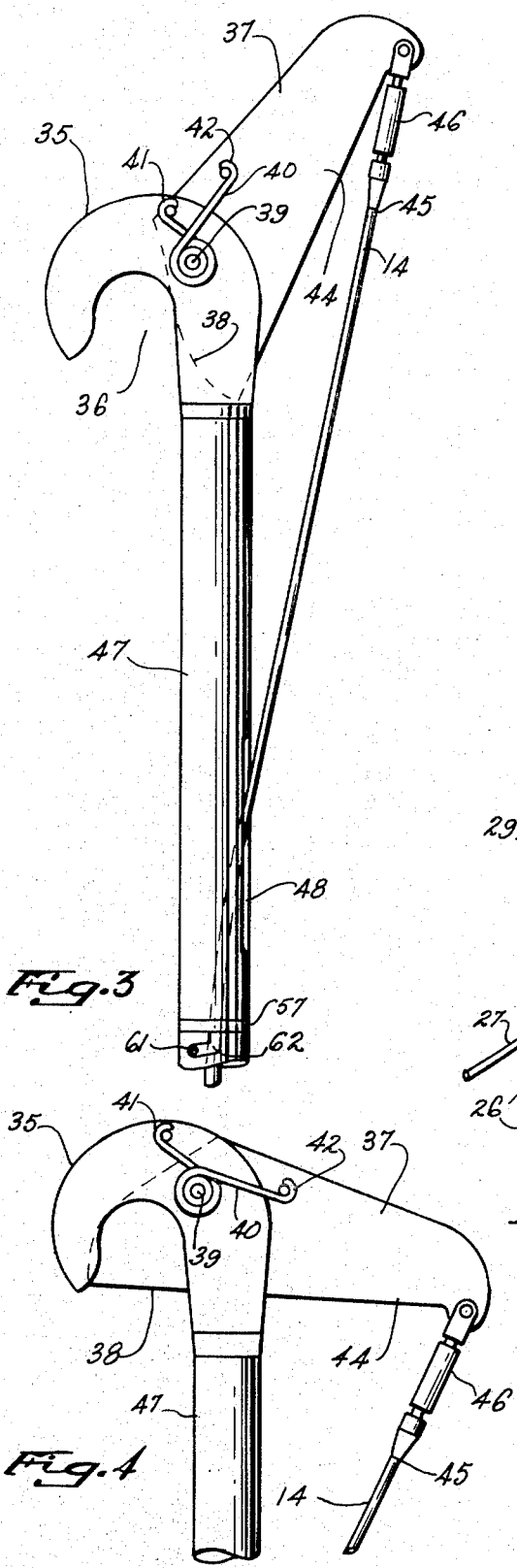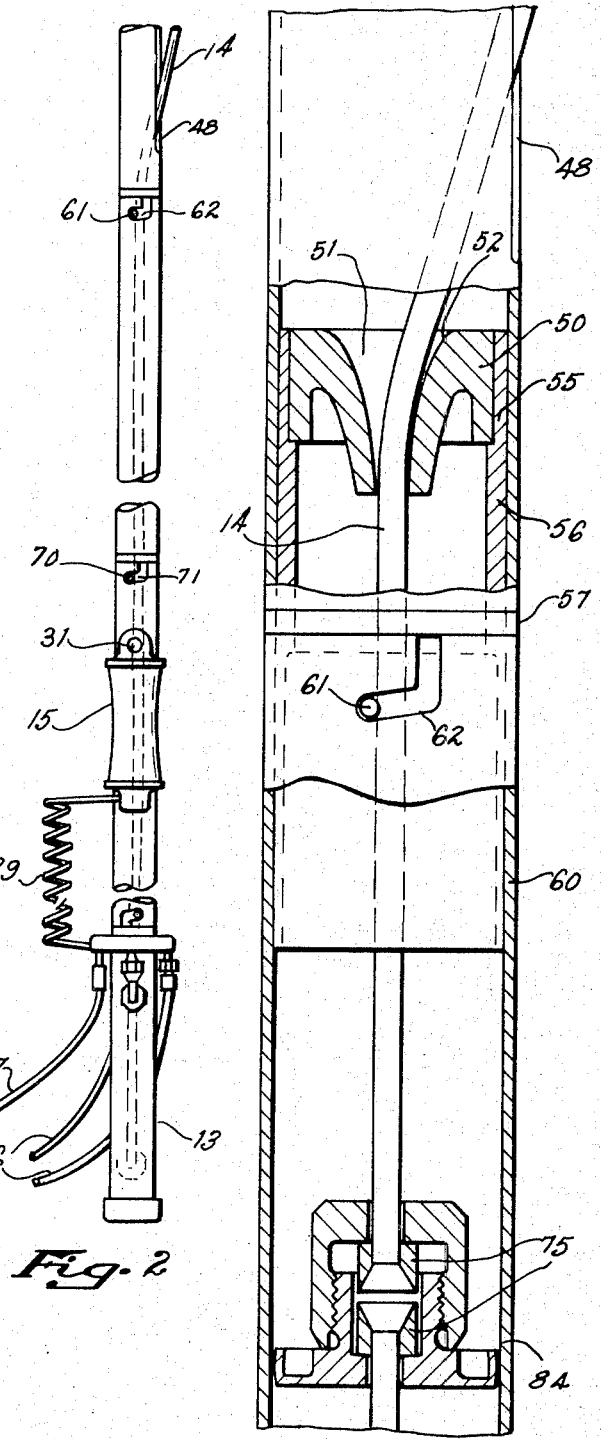

3,721,004

PRUNING TOOL

This application is a continuation-in-part application of my copending application Ser. No. 125,276, filed Mar. 17, 1971, which application has been abandoned in favor of this application.

This invention relates to a pruning tool for cutting limbs from trees.

There are in use today two general approaches to the problem of cutting limbs from trees. The first, which has been used for many years, involves the use of small hand tools such as saws for the larger limbs and leverage type extension pruning elements for the smaller limbs. The use of the former tool requires an agile workman to climb into the tree to get at the higher limbs; the use of the latter type severely limits the size of limb he may cut, due to physical limitations of human anatomy.

The other general approach, which eliminates to a great extent the requirement of climbing into trees, involves the use of a vehicle called a "cherry picker". The cherry picker provides a boom having a small compartment on one end where an operator can stand, the compartment having controls by which the position of the boom can be moved from place to place to bring the operator into close proximity with limbs high up on a tree which the operator can then trim with appropriate tools.

Whereas the approach to cutting the larger limbs is inefficient, laborious and dangerous (with high attendant insurance costs) in requiring the workman to climb into the trees to get at the limbs to be pruned, the latter approach is expensive, particularly in relation to the cost of the vehicle, and it is not necessarily universal in application for it is not always feasible to drive a cherry picker into a certain position to get at the trees to be pruned.

The objective of the present invention has been to provide a tool for cutting limbs of intermediate size which admits of greater efficiency at much lower cost over the cherry picking type approach, and even greater efficiency and safety over that of climbing into position for this operation.

More specifically, the invention comprises an elongated tube having a cutting element supported on one end, a piston and cylinder actuator on the other end and a cable interconnecting the two. The tool may be, for example, 16 feet long to thereby enable a workman standing on the ground to reach up into trees to cut limbs of 3 inch diameter or more which may be over 20 feet above the ground. With the tool he can move very quickly and efficiently around the tree without having to climb into the tree as was required for limbs of this size by the former approach, nor does he have to contend with the manipulation of a cherry picker boom or the driving of the cherry picker vehicle around the tree to do a complete pruning job. Still further, the elongated cutting tool can be carried to almost any location which is accessible by foot for pruning trees which would be fairly inaccessible to the cherry picker vehicle. Still further, the tool can be carried on the back of a pickup truck and used while the workman stands on the bed of the pickup truck to gain additional height and mobility.

The concept of an elongated cutting tool introduces additional problems. The tool must be light enough to enable the workman to use it throughout the day without exhaustion and, on the other hand, the tool must be strong enough to withstand the forces required to cut limbs of substantial size, as for example, 3½ inches without failure. Known hand cutting tools and even power operated cutting tools which are hand manipulated have been necessarily short, or greatly limited in capacity, so as to be light enough for an operator to use and strong enough to withstand the rigors of the pruning operation. When a tool is lengthened beyond 6 feet or so, bending moments are introduced because of the weight of the cutting element at the end of the tool. To resist the bending moment, the previous solution has been to strengthen the support for the tool by adding to the sectional size of the column, thereby increasing its weight.

The present invention provides a solution to the problem of the need for a long but lightweight pole for the support of the limb cutter by providing an elongated hollow tube which has a very thin wall and which may be of a metal which is magnesium or aluminum or which may be of an insulated material such as Fiberglas for those applications wherein contact with electrical conductors may be involved. The tube has its cable running through the center of the tube and has centering guide means for confining the cable to the center of the tube so that when tension is applied to it, there is no chance for the cable to drift to the side of the tube to provide an undesirable bending moment on the tube. Through this design a very thin tube is employed which is only stressed in compression which is well within the capability of the tube. At the cutter element end of the pole, there is a short tube length provided with an opening and means for guiding the cable outside the tube into a connection with the lever arm of the cutting element. While that configuration does introduce a bending moment to the length of this tube, it is applied to such a short length of this heavier walled end tube that this end tube section, in that vicinity, can easily withstand it. It should be understood that when "cable" is used herein, the term should be considered to embrace a rod thin and flexible enough to require centering.

It has been another objective of the invention to provide a pruning tool of the type described above wherein the tube, and optionally the flexible cable, is formed in sections which may be disassembled for storage and transportation but which may be easily assembled for operation.

It has been another objective of the invention to provide a pruning tool of the type described and a handle slidably mounted on the tube so that the tube can be conveniently grasped and supported at any position along its length for proper balance and facility for cutting lower limbs. The handle is preferably provided with an electrical switch by which the power to the piston and cylinder may be selectively applied.

These and other objectives of the present invention will become more readily apparent from the following detailed description taken in conjunction with the accompanying drawings in which:

FIG. 2 is a fragmentary elevational view of the cutting tool;

FIG. 3 and FIG. 4 are elevational views of the cutter at the end of the tool in two of its positions;

FIG. 5 is an elevational view partly in section illustrating the mounting of the cable guide means within the tube;

Figure 9:
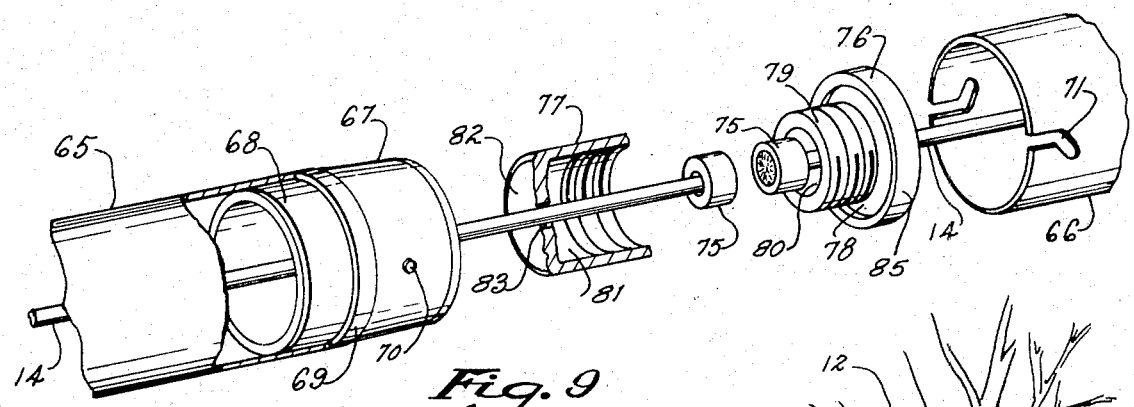
Figure 8:
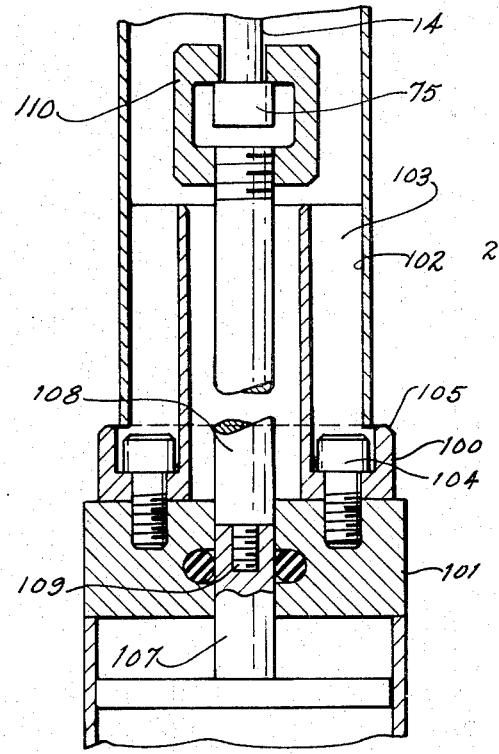

FIG. 8 is a sectional view illustrating the connection of the piston of a piston and cylinder actuator to the cable; and FIG. 9 is a disassembled perspective view illustrating the manner in which the joints between tube sections and between cable sections are formed. FIG. 9 also illustrates elective combination of sliding type guide with cable connection as an alternate to separate guide shown in FIG. 6.

Figure 1:
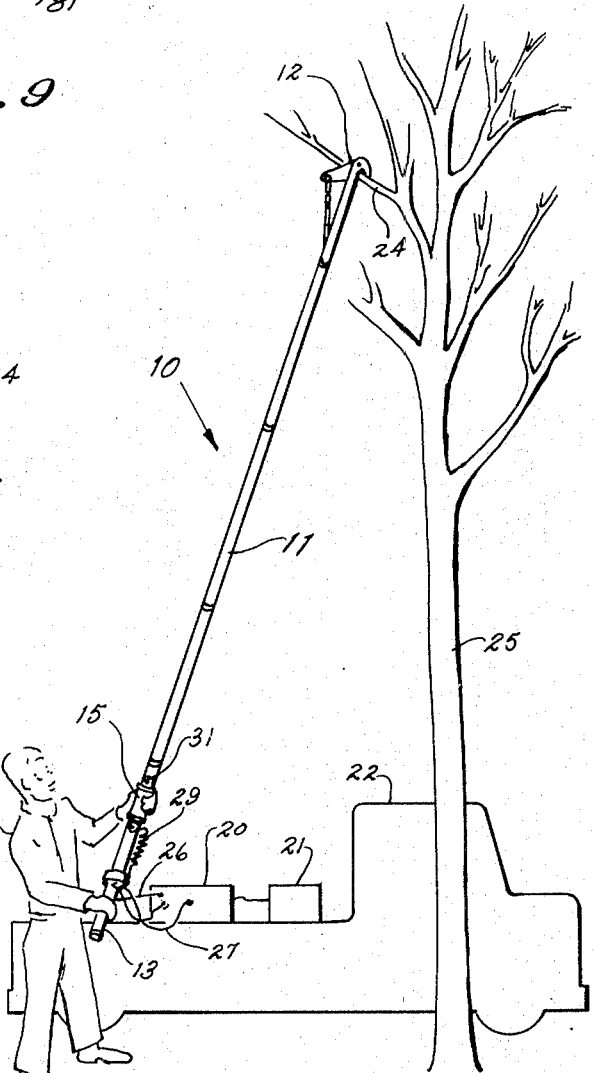
FIG. 1 is an elevational view illustrating the operation of the invention.

Referring to FIG. 1, the invention is illustrated at 10 and consists of a tube 11 having a limb cutter 12 at one end and a piston and cylinder 13 at the other end, the piston and cylinder being connected to the cutter by a cable 14. A slidable handle 15 is mounted on the tube to be grasped by the workman. Power to the actuator is supplied by a pump 20 which is motor driven and powered by a battery 21, the assembly being shown as carried on a pick-up truck 22.

It can be seen that a workman indicated at 23 can conveniently trim limbs 24 which are very high up on a tree 25. He can conveniently move about the tree within the limits permitted by hose connection 26 from the pump 20 and electrical connections 27 for switching the pump motor on and off for the selective application of power to the unit.

As illustrated in FIGS. 1 and 2, the tube may be formed in sections so that it can be disassembled for storage and transportation and can be assembled for use. As shown in FIG. 2, the lowermost section consists of a piston and cylinder 13 which is connected by hoses 26 to the pump 20. The piston and cylinder may be a double-acting device driven in both directions by the selected medium, either pneumatic or hydraulic, and the cutting knife is returned to the open position by a spring on the cutter element to be described below. The piston and cylinder also carries an electrical conductor 27 which is connected through a coil conductor 29 to a slidable handle 15 having a thumb-operated switch 31. The handle is slidable to any position along the tube to the extent permitted by the coil cord 29 so that the workman can achieve the proper balance of the tube as required by the height of the limbs being cut. The handle 15 is preferably provided with a friction grip on the tube actuated by squeezing the handle so that the position to which the handle is slid along the tube can be fixed when the workman grips the handle.

A cutter is mounted on the section at the upper end, or end most remote from the piston and cylinder. The cutter consists of a bifurcated hook 35 having an opening and cutting edge 36 to receive a limb up to 3½ inches in diameter, for example, a cutting element 37, having a sharp blade edge 38, is pivoted at 39 on the hook 35. A spring 40 having one end 41 fixed to the hook and the other end 42 fixed to the cutting element biases the cutting element to the open position illustrated in FIG. 3. The cutting element has an integral lever arm 44. The cable 14 is connected at its end 45 through a turnbuckle 46 to the end of the cutting element 37, all as shown in FIGS. 3 and 4.

As shown in FIGS. 3 and 5, the upper tubular section 47 has an elongated opening 48 in it through which the cable 14 passes. The cable is guided through the opening by a fixed cylindrical cable centering element 50 having a central opening 51, slidably fit to cable at lower end, and which flares radially outwardly in the direction of the cutting element as indicated at 52 to permit the cable to bend outwardly toward the cutting element 37 without unduly stressing the cable. In a preferred embodiment of this invention, the opening has a 2-inch radius flare for a 3/16 inch diameter flexible steel cable. This large radius flare provides a bell shaped opening 52 of substantially low friction against which the cable cannot bind as it would over a sharp corner, and it reduces early fatigue failure of cable.

The centering element 50 is fixedly seated on the upper end 55 of a tube splicing sleeve 56. The splicing sleeve has, intermediate its end, an integral collar 57 which projects radially outwardly a distance equal to the thickness of the tube so that when the tube sections are joined together, the collar provides a substantially uninterrupted outside surface for the tube. The upper end of the sleeve 56 is fixed in the upper, short, heavy wall tube section 47. The lower end is adapted to slidably receive the adjacent tube section 60. A pin 61 is fixed on the sleeve to receive a bayonet slot 62 on the upper end of the section 60 to lock the respective sections together.

A similar joint, without fixed cable centering element previously described, is formed for the intermediate tube sections, as illustrated in FIG. 9. In FIG. 9 an upper section 65 is joined to an adjacent lower section 66 by a splicing sleeve 67. The upper end 68 of the splicing sleeve 67 is fixed to the tube section 65. The sleeve has an integral collar 69 which has an outer surface flush with the outer surface of the tube section 65. The lower section is adapted to be slidably received in the lower tube section 66 and secured there by a pin 70 and bayonet slot 71 connection.

The cable may also be formed in sections and joined together as illustrated in FIG. 9. In that embodiment, the cable ends have plugs 75 fixed to them, the ends are joined together by a threaded coupling boss 79 and a coupling nut 77. As part of this same illustration, there is shown a combination of sliding guide (similar to FIG. 6) in which guide and cable coupling are made integral, in which case centering ring 76 has a washer-like portion 78, making it in the form of a disc, which supports the integral threaded boss 79 having a recess 80 to receive one of the plugs 75. The recess 80 has a bottom wall against which the plug 75 is seated, the bottom wall having an opening central and closely fitting for the cable to pass through. The coupling nut 77 is threaded to mate with the threaded boss 79. It, too, presents a recess 81 which receives the plug 75, the recess also having a bottom wall 82 against which the plug 75 seats, the bottom wall having an opening 83 central and closely fitted through which the cable passes.

The centering ring or disc has a flange 85 whose diameter is slightly less than the inside diameter of the tube to permit it to be slidable with respect to the tube. Its periphery has rounded corners, or preferably of spherical section, as at 84 (FIG. 6), so that it can cock slightly with respect to the tube and still guide closely without binding on the Internal surface of the tube. The combination cable coupling and centering guide in each tube section is located just downwardly with respect to each adjacent splicing sleeve, and will slide farther downwardly when tension is applied to the cable during the cutting operation. Since the downward travel of the centering guide is limited by piston travel, the guide does not interfere with the splicing sleeve in the next lower tube section.

Figure 6:
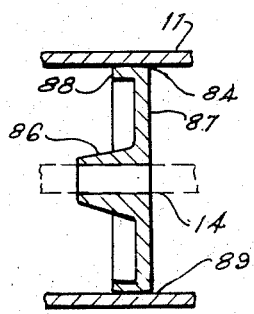
FIG. 6 and FIG. 7 are cross sectional views illustrating alternative cable centering means, one sliding in the tube, the other fixed in the tube, respectively.
Figure 7:
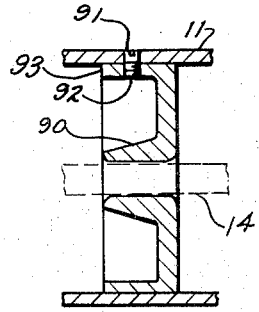

Alternative forms of centering rings are illustrated in FIGS. 6 and 7. In FIG. 6 the ring, or disc, consists of a central boss 86 which is fixed to the cable 14, a radial extension 87 and an axially directed flange 83, the flange periphery being rounded at its corners 84, or preferably of spherical section, and dimensioned to be slidable with respect to the internal surface 89 of the tube 11. This embodiment can be employed when the tube-pole is not sectioned, and therefore the cable need not be sectioned.

Another form of the centering ring is illustrated in FIG. 7 and consists of a boss 90 through which the cable 14 slidably passes. This guide is either fixed with respect to the tube (as shown in FIG. 7) or fixed within the pole splicing sleeve 67 (as shown in FIG. 9). In either event it is secured by means of a setscrew 91 passing through the wall of the tube 11 and into a threaded hole 92 in the flange 93 forming a part of the centering ring. Thus, it can be seen by comparing FIGS. 6, 7 and 9 that the cable can be fixed to the guide with the guide sliding with respect to the tube as illustrated in FIG. 6, or alternatively, the centering ring, of somewhat different design, can be fixed to the tube with the cable being slidable with respect to the centering ring. In either case, the centering rings, spaced along the length of the tube, maintain the cable in the center of the tube so that the tube is stressed only in compression (except at the short endmost section 48) with the consequent elimination of undesirable bending moments. In this way a very light weight tube can be used, able to withstand the compression forces, thereby permitting a long, stable, cutting element to be formed.

The tube and cable are connected to the piston and cylinder as illustrated in FIG. 8. An adapter 100 is bolted to the upper face of the cylinder 101. The adapter is a generally cylindrical element having an outside diameter at 102 approximately equal to the inside diameter of the tube so that the tube can slide down over the adapter. The adapter is counterbored at 103 in four symmetrically disposed locations around the circumference of the adapter so as to accommodate for mounting bolts 104. A shoulder 105 is provided on which the lower edge of the tube 102 seats when the device is assembled.

The cable is connected to a piston rod 107 by a connector 108. The lower end of the connector is threaded as at 109 into the piston rod. The end of cable 14 has fixed to it a plug 75 and is joined to the connector 108 by a coupling nut 110 similar to other nuts 77 previously described and in like manner. All parts described here, as well as elsewhere, held to close tolerances for preservation of centrality of cable pull relative to tube walls.

In the operation of the invention, the limb cutting tool is assembled as shown in FIG. 1 and connections are made to the pump and motor as indicated at 26 and 27. The workman places the hook 35 on the limb to be cut, the workman having first positioned the slidable handle 15 to that location which gives him the most comfortable balance of the limb cutter. When the hook is placed over the limb, the workman operates the switch 31 on the handle causing the pump motor to drive the pump to force fluid under pressure into the upper end of the cylinder 101 to drive the piston downwardly. The movement of the piston downwardly applies a tension to the cable 14 and effects the rotation of the cutting element 37 in a clockwise direction as viewed from the position of FIG. 3 to the position of FIG. 4, whereupon the limb is severed. During the application of tension, the fixed terminal centering element and centering rings, or discs, hold the cable in the center of the tube so that the tube is stressed uniformly only in compression, thereby avoiding undesirable bending moments which would tend to warp and then crumple the thin walled tube.

The pruning tool per se, that is, without the battery and pump, will weigh less than about 18 pounds for a 16 foot length. Depending upon the requirements of the user, it can be operated as shown in FIG. 1 wherein the pump and battery are supported on a vehicle which can be a pick-up truck or can be a hand-pulled vehicle such as a golf cart. Alternatively, the pump could be carried on a suitable pack strapped to the back of the workman enabling the workman to move conveniently around a tree without having to drag hydraulic tubing around with him. Still further, the battery and pump might be mounted on the back of the workman so that the workman can operate completely independently of any vehicle carrying the battery and/or pump.

In one preferred embodiment of the invention, there are three thin walled sections 60 of tubing joined together to form a pruning tool which has an over-all length of 12 feet. Each of these three sections is made from 6061-T6 aluminum alloy tubing having an outside diameter of 1¾ inches and a wall thickness of 0.058 inch. In this preferred embodiment of the invention, there are three guides spaced 31 inches apart intermediate of the pole ends and in addition to the exit centering guide 50 which is fixed within sleeve 56. This sleeve 56 is located within the heavier walled head support tube 47 which has an outside diameter of 1¾ inches and wall thickness of 0.083 inch. This construction has been found to result in a very lightweight long efficient pruning tool which may be easily transported and used by an average strength workman.

A long thin walled pruning tool light enough to be easily transported does not have enough resistance to bending forces when cutting power is applied to be practical or useful in the absence of the centering guides. Specifically, I have found that a pole of the same dimensions as set forth hereinabove in my preferred embodiment is impractical and readily fails if there is not at least one guide of either type shown in FIG. 6 or 7 located between the upper exit centering guide 50 and the attachment of the flexible steel cable to the piston of the motor 13. I have further found that the guides should optimally be spaced apart a distance of approximately 18–20 times the diameter of the tube of metal or material required to obtain the necessary strength of the tool. This ratio varies slightly from material to material and, of course, may be increased by simply sacrificing some of the resistance to bending moments in the tool. I further found that pruning tools having an over-all length-to-diameter ratio in excess of 72 to 1 require the centering guides for the flexible cable if the tool is to be light enough to be easily handled and yet have the necessary rigidity and compressive strength to be useful as a pruning tool. The tensioned flexible cable, when properly centered by the guides, has the effect of materially increasing the compressive load capacity of the long thin walled column oF the tool, in much the same manner that prestressed concrete is strengthened by tensioned internal struts In the absence of the centering guides, though, the tensioned cable has the effect of increasing the compressive load on one side of the column of the tool when it starts to bend and of causing premature collapse of the thin column on that side.

Having described my invention, I claim:

1. A pruning tool comprising
an elongated tube,
a cutter having at least one pivoted cutting adjacent
a cable passing through the center of said tube and connected to said cutter element to actuate said cutter when said cable is tensioned,
at least one cable centering means in said tube intermediate the ends of said tube,
means at the other end of said tube for applying tension to said cable, and
a handle slidably mounted on said tube and having friction grip means fOr temporarily fixing the handle on said tube.

2. A pruning tool according to claim 1, in which a plurality of said cable centering means are spaced along the length of said tube.

3. A pruning tool according to claim 1 in which said tension applying means is a piston and cylinder connected to said cable, and
means for applying a fluid under pressure to said cylinder.

4. A pruning tool according to claim 1 in which each said cable centering means comprises a disc fixed to said cable, said disc having a flange around its circumference for slidable engagement with the inside walls of said tube.

5. A pruning tool according to claim 1 further comprising switching means for selectively applying fluid pressure to said actuator, said switching means being operable from said slidable handle.

6. A manually operable and manipulatable pruning tool comprising,
an elongated tube having a length to diameter ratio of at least 72 to 1,
a cutter having at least one pivoted cutting element mounted at one end of said tube, the pivot of said cutting element being located near the axis of said tube,
a flexible cable passing upwardly from adjacent the opposite end of said tube, through the side wall of said tube, and connected to said cutter element outboard of said tube so that the cable slopes at an angle of at least 10° relative to the axis of said tube from the point at which it passes out through the side wall of said tube to the point of attachment to said cutter element, said cable being operable to actuate said cutter when said cable is tensioned,
means at the other end of said tube connected to said cable for applying tension to said cable, and
a plurality of cable centering means in said tube intermediate the ends of said tube, at least one of said cable centering means being located adjacent the point at which said cable passes through said side wall of said tube, and at least one other of said cable centering means being located between said one centering means and the point of attachment of said cable to said tensioning means.

7. A pruning tool accordIng to claim 6, in which the means for applying tension to said cable comprises a motor.

8. A pruning tool according to claim 6 in which said tension applying means is a piston and cylinder connected to said cable, and
means for applying a fluid under pressure to said cylinder 9. The pruning tool of claim 6 in which said cable centering means are spaced no further apart than a multiple of 40 times the diameter of said tube.

10. The pruning tool of claim 6 in which said cable centering means are spaced no further apart than a multiple of 25 times the diameter of said tube.

11. A pruning tool according to claim 6 in which said tube is formed in a plurality of sections.

12. A pruning tool according to claim 11 in which said cable is formed in sections approximately the length of said tube sections
said cable sections being joined together by said cable centering means.

13. A pruning tool according to claim 6 in which each said cable centering means comprises a disc fixed to said cable, said disc having a flange around its circumference for slidable engagement with the inside walls of said tube.

14. A pruning tool according to claim 6 in which each said cable centering means comprises a disc fixed to said tube, said disc having a central opening through which said cable may slidably pass.

15. A pruning tool according to claim 6 in which said one cable centerIng element has a curved flaring central opening for the passage of said cable, the radius of said curved flaring opening being at least twice the diameter of said cable so that said cable does not bind upon said one centering element.

16. The pruning tool of claim 15 in which the radius of said curved flared opening is at least 8 times the diameter of said cable.

* * * * *